Feb. 26, 1935.  C. HARNIST  1,992,572
PROCESS FOR PRODUCING SULPHATES AND SULPHUR
Original Filed April 20, 1925
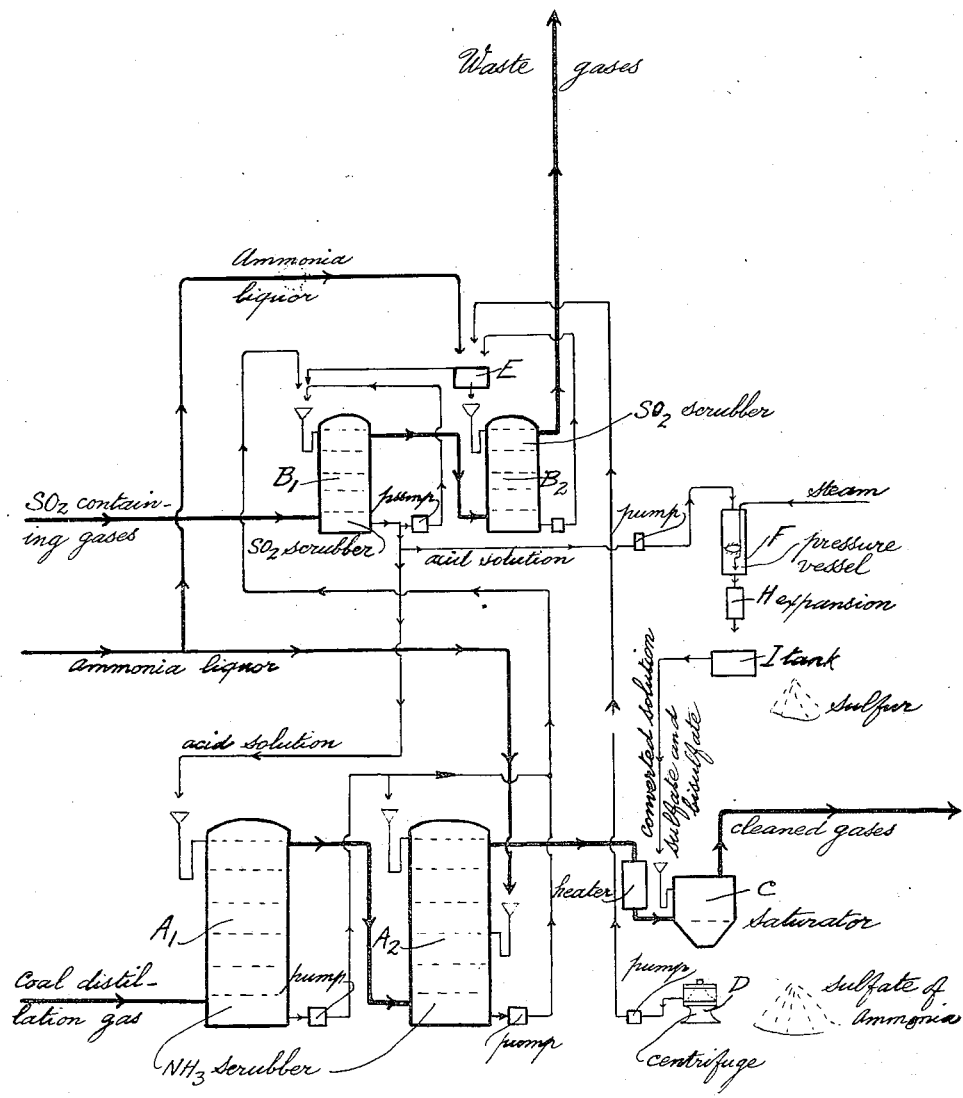
Inventor
Charles Harnist
by
Andrew T. Dupont
his Attorney

UNITED STATES PATENT OFFICE 1,992,572

PROCESS FOR PRODUCING SULPHATES AND SULPHUR

Charles Harnist, Paris, France

Application April 20, 1925, Serial No. 24,681. Renewed November 17, 1933. In Germany April 25, 1924

13 Claims. (Cl. 23—119)

I have found that the salts formed by the action of sulphur dioxide, preferably employed in excess, on ammonia or basic ammonium compounds, such as hydroxide, carbonate, sulphide, cyanide in the presence of water and of sulphuretted hydrogen, which ammonium salts consist of a various mixture of sulphites (acid, normal, or both), thiosulphate, polythionates, in which the sulphites or the polythionates may be absent and which must contain at least two molecules of oxygen combined with sulphur for one molecule of ammonia (O:HN$_3$=2:1), can be converted entirely into sulphates (normal and eventually acid) and sulphur in the shortest time when they are heated under pressure.

The said salts are obtained by treating solutions, or vapors, or gases containing NH$_3$ and H$_2$S, such as coal distillation gases, the ammonia liquor from it, or vapors resulting from the distillation of ammonia liquor and the like with SO$_2$ or gases or solutions containing it, such as combustion gases from sulphur, pyrites, etc., aqueous solutions of SO$_2$ or of acid sulphite or of thionates of ammonia and the like.

The conversion of a mixture of sulphites and thiosulphate is effected, e. g. according to the reaction:

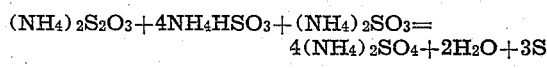

The conversion of polythionates and thiosulphate occurs, e. g. as follows:

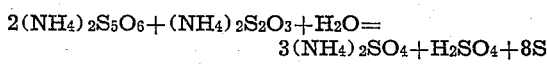

and the conversion of polythionates, thiosulphate and sulphites by the reaction:

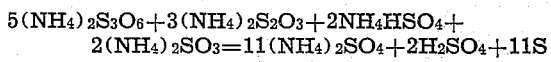

These various mixtures depend on the proportion of the hydrogen sulphide to the ammonia and sulphur dioxide.

In the polythionates, this proportion is the highest possible for the hydrogen sulphide and sulphur dioxide, and in the neutral sulphide, the lowest (=O for the H$_2$S).

The conversion of polythionates into sulphate and sulphur by heating their solution under atmospheric pressure is well known. Sulphur dioxide is freed according to the reaction

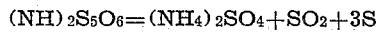

The reaction will, however, proceed differently when heating the said solution in a closed vessel, since the simultaneously emitted sulphur dioxide does not escape, but influences the reaction and hinders the conversion, if the temperature and pressure are not high enough.

The polythionates are, at a sufficient temperature, transformed in the following manner:

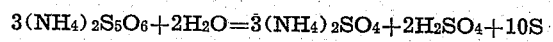

The formation of said salts is particularly difficult, when SO$_2$, H$_2$S and NH$_3$ are employed in the gaseous state and when, moreover, as in the industrial practice, these gases are contained in other gases, the SO$_2$ being produced by the combustion of sulphur, sulphides of metals (pyrites, etc.), hydrogen sulphide, etc., and the H$_2$S and NH$_3$ being obtained in a very diluted state in the distillation gases of coal, lignite and the like. The preparation of the salts is, accordingly, elaborated especially in the following description.

One of the difficulties is due to the partial dissociation of the ammonium salts in the gases, hindering the total recovery of NH$_3$ and SO$_2$. This inconvenience can be obviated by the advantage of the above stated reactions to produce free sulphuric acid (bisulphate) which is used, owing to its non-volatility, to fix the ammonia remaining in the gases, as explained further. By this method, it is possible to leave even uncombined ammonia in the gases on purpose, in order to reduce to a minimum the dissociation of its salts and the conveyance of SO$_2$ by the gases.

Another difficulty arises from the necessity of avoiding the lowering of the heating value of the coal distillation gases by mixing them with the gases containing the SO$_2$, while employing, nevertheless, always the same liquor for the treatment of both, in order to obtain a concentrated solution of the ammonium salts.

This difficulty may be easily surmounted by scrubbing the two gases separately and alternately with the liquor. But, it is also possible to effect a simultaneous treatment by causing the two gases to pass through an apparatus filled with the liquor through, e. g., a saturator and by separately collecting the gases in the usual manner the SO$_2$ containing gas, the amount of which is much lower, being introduced into the liquor in a confined room, e. g., at the center thereof and withdrawn before it leaves the liquor, through a pipe immersed in the liquid, while the NH$_3$ containing gas traverses the rest of the liquor and is discharged from its surface for further treatment.

After the treatment in the saturator, the SO$_2$ gas is freed from the remaining SO$_2$ in one, or several, apparatus (scrubbers or saturators), which are directly compounded by a by-pass with the SO₂ gas before its inlet in the saturator, in order to regulate the admission of SO₂ to the latter.

The treatment in the said apparatus is effected with the solution of the saturator, to which solution ammonia liquor and the wash water from sulphate may be added, or with the solid salts formed in the saturator and withdrawn and dissolved in ammonia water.

From the thus acidified solution, a portion is, preferably, constantly withdrawn to be converted into sulphate, sulphur and free sulphuric acid by heating under pressure. The amount of the free sulphuric acid may be regulated by the amount of SO₂ absorbed by the solution before its conversion, the excess being diminished by adding some solution from the saturator.

The converted liquor, after having been separated from the sulphur, is then employed to recover, with the free sulphuric acid contained, the ammonia retained in the NH₃ gas leaving the saturator, which operation may be effected in a second saturator, in which the solution may be evaporated in any known manner, e. g., by heating the gas before its admission therein, while the crystalized sulphate may be brought out, as usual.

Instead of the coal distillation gases, the gases or vapors from the distillation of ammonia liquor may be employed.

The aforementioned separate and alternate treatment of the two gases in scrubbers requires more and larger apparatus, but less power for circulating the gases. One, or several scrubbers may be used, and, eventually, a saturator.

The wash liquor circulating from the SO₂ gases to the NH₃ gases may be maintained acid or, preferably, semi-neutral (one molecule normal and one molecule acid salt) by mixing with the liquor from the NH₃ gases treatment in order to avoid the transfer of SO₂ into the NH₃ gases. If it is desired to leave uncombined NH₃ in the latter, the admission of the wash liquor into the scrubber must be suitably limited. A portion of the liquor from the SO₂ treatment is also in this case, withdrawn for the conversion and the converted liquor used to recover the NH₃ not absorbed in the NH₃ gases, which recovery may be effected in a saturator or in a scrubber. The solid sulphate may be recovered by evaporation in any well known manner.

By using several apparatus, e. g., two or more stages, for the treatment of the NH₃ gases, the recovery of the H₂S and NH₃ gases may be had in accordance with the following reaction:

$$2H_2S + SO_2 = 2H_2O + 3S,$$

which proceeds, as is well known, very slowly and incompletely. It can, however, be accelerated and completed by the addition of SO₂.

In order to realize these conditions, the gases or vapors containing NH₃ and H₂S are treated first with more SO₂ than is necessary to decompose the H₂S; then, in a second treatment, the excess SO₂ is removed with NH₃, preferably, also in excess, and may be finally recovered in any known manner, preferably, by the free sulphuric acid of the converted solution, as above stated.

Referring to the accompanying flow sheet, the NH₃ gases traverse the set of scrubbers A₁—A₂ and, thereafter, are led into the saturator C. The SO₂ gases traverse the set of scrubbers B₁—B₂, in which they are scrubbed with the wash water of the sulphate discharged from the centrifuge D into the tank E, to which may be added concentrated ammonia liquor. The liquid is systematically circulated in the scrubbers and leaves them sufficiently acidified to be sent into the scrubber A₁, and, thence, being partly neutralized by the NH₃ of the gases, a part is conducted into scrubber A₂, to which ammonia liquor, or vapors and gases from its distillation, may be added. If the ammonia liquor or condensed ammonia vapors are employed, it may also be directly added to the liquor from the first scrubber. The liquors are then returned to the scrubber B₁ and when they have become sufficiently concentrated by this alternate circulation, a portion of the acidified solution leaving this scrubber is pumped into the pressure vessel F, which is steam heated. The solution thus converted into sulphate and sulphur descends through the expansion vessel H into the tank I, in which it is separated from the sulphur, and then into the saturator C, in which it is evaporated by the NH₃ gases previously heated, after having absorbed the remaining NH₃ from the gases. Sulphuric acid produced in accordance with known processes, such as the waste sulphuric acid from the purification of benzol, may be added into the saturator from time to time to increase the acidity.

The acidity of the solution may, as above described, also, in this example, be regulated and, if desired, reduced to O by the content of SO₂ before the conversion, adding to the acidified solution neutral or ammoniacal liquor from the scrubbers A₁ or A₂. The recovery of the remaining ammonia and the evaporation may be effected by any desired manner other than through the saturator. The method with the saturator, allowing the simultaneous recovery and evaporation, is, however, preferred under the conditions of the process which permit, by acidifying sufficiently, the liquor arising from the SO₂ scrubbers to produce sulphuric acid by heating, under pressure, the best absorption of ammonia. A saturator may, also, be employed instead of scrubber A₁. This saturator will allow the simultaneous treatment of the SO₂ and of the NH₃ gases, as above described. But, in this case, also, a final recovery of the SO₂ will be necessary through one or two scrubbers whose volume is to be reduced in accordance with the first absorption of SO₂ in the saturator. On the other side, the saturator will require more power for conducting the gas therethrough.

If the complete removal of H₂S and HCN is not desired, the second scrubber may be omitted. The admission of the washing liquor is then to be limited in order not to absorb the whole ammonia, which is removed in the saturator C.

The cyanogen of the gas is fixed in a known manner as sulphocyancompound by the sulphur formed in the scrubber A₁ by the reaction between SO₂ and H₂S and pumped with the wash liquor into scrubber A₂. This sulphocyanate is also converted by heating the solution, under pressure, into sulphate and sulphur by a well known reaction with the sulphuric acid formed.

If no sufficient ammonia liquor is available, the NH₃ gases are divided into two parts, of which one is charged in the first scrubber with an excess of SO₂, then removed in the second scrubber by the NH₃ and the H₂S of the other part, then reunited with the first part in the scrubber, the circulation of the wash liquor and the further treatment of the united gases being the same as before.

With the $NH_3$ gases proceeding from the first to the second scrubber (and this path may be extended, at will, by another scrubber) the reaction between $SO_2$ and $H_2S$ will continue. I find that this reaction can be furthered by subjecting the gases to the action of an electric field, preferably, of great strength. This action is promoted by the presence of water, and the latter will also act to isolate from the reaction the $CO_2$, which is usually contained in the coal gases, by dissolving the $SO_2$ and $H_2S$, the $CO_2$ being but slightly soluble. The water may be introduced into the gases in a finely divided state, or may be produced by the condensation of steam, which is already present in the gases, or may be introduced into them.

These treatments may also be effected by the use of hot gases before removal of the tar therefrom, or the tar, in order to preserve the heat of the gases, may be removed at a high temperature above the dew point. Herein, the temperature in the first scrubber may exceed 100° C., in the second it should be 100° C., but without descending much below the dew point, which condition is also to be observed for the saturator C.

Instead of gases from the distillation of coal, any other gas or vapor containing $NH_3$ or $H_2S$ or both may be employed. If only $H_2S$ is present, the $NH_3$ may be added.

The conversion of the ammonium salts formed according to the above disclosed methods into sulphate and sulphur by heating under pressure is effected by conducting the obtained solutions, preferably, in a continuous manner through the pressure vessel by pumping through the closed vessel while continuously heated. The latter may be provided with a stirrer and steam jacket, or a coil in the usual manner. I have found that it is more advantageous to introduce steam directly into the closed vessel, preferably, through one or more circular tubes with several tangential branches open at the ends. The steam issuing from these tangential branches will give the liquid a rotary motion and will replace the known stirrers to advantage. This makes the reaction uniform, and will further serve to collect the sulphur into drops by the high speed of rotation and to prevent the entering solution, at once, leaving the vessel. At the outlet of the vessel a strainer device may be applied, which causes the sulphur to issue in the form of drops and distributes same upon the strainer in order that sulphur, which is still in the finely divided state, may be retained and agglomerated. To prevent the sulphur from solidifying in the outlet, a steam tube is branched from the circular tube and leads through the strainer to the opening. The steam may, also, serve wholly or partly to heat the solution to the temperature needed by the reaction and is continuously adduced when the solution is conducted continuously through the vessel.

In this manner, the conversion of the said solutions containing thionates, which may be mixed with sulphites, will take place even below 150° C., but it may be accelerated by heating above 150° C. The heat which is to be supplied depends upon the concentration of the solution and the percentage of sulphurous acid.

To obtain the solid sulphate and the sulphur, the converted solutions may then be treated in the above described manner.

I claim as my invention:—

1. The process of producing sulphates and sulphur by intramolecular transformation which consists in heating under pressure a solution obtained by the action of sulphur dioxide on ammonia and its basic compounds forming ammonium sulphites and thionates, in the presence of water and of sulphuretted hydrogen.

2. The process of producing sulphates and sulphur by intramolecular transformation which consists in heating under pressure a solution obtained by the action of sulphur dioxide on ammonia and its basic compounds forming ammonium sulphites and thionates, in the presence of water and of sulphuretted hydrogen, the solution being heated by introducing steam directly into it.

3. The process of producing sulphates and sulphur by intramolecular transformation which consists in heating under pressure a solution obtained by the action of sulphur dioxide on ammonia and its basic compounds forming ammonium sulphites and thionates, in the presence of water and of sulphuretted hydrogen, the solution being heated by introducing steam thereinto in such manner as to give the liquor a rotary motion.

4. The process of producing sulphates and sulphur by intramolecular transformation which consists in heating under pressure a solution obtained by the action of sulphur dioxide on ammonia and its basic compounds forming ammonium sulphites and thionites, in the presence of water and of sulphuretted hydrogen, the solution being heated by introducing steam thereinto in such manner as to prevent the sulphur from solidifying at the outlet of the closed vessel.

5. The process of producing sulphates and sulphur by intramolecular transformation which consists in heating under pressure a solution obtained by the action of sulphur dioxide on ammonia and its basic compounds forming ammonium sulphides and thionates, in the presence of water and of hydrogen sulphide, while the solution is conducted continuously through the closed vessel.

6. The process of producing sulphates of ammonia and sulphur by intramolecular reaction, which consists in heating, under pressure, solutions obtained by the action of sulphur dioxide, in the presence of water and of hydrogen sulphide upon ammonia containing gases, the addition of free sulphur dioxide to the gases being limited in order that the gases retain ammonia, and recovering the ammonia by a further treatment in any known manner.

7. The process of producing sulphates and sulphur by intramolecular transformation which consists in heating under pressure solutions obtained by scrubbing coal distillation gas containing ammonia and hydrogen sulphide with water, acidifying the latter separately with sulphur dioxide for again scrubbing the gas, in a cycle, until it becomes sufficiently enriched with the thus formed salts (sulphites, thionates) for the said transformation, to which the solution is continuously conducted after the acidification and replaced in the scrubbing by water.

8. The process set forth in claim 7, wherein the scrubbing of the gas is effected by limiting the admission of the acidified solution in order to leave some ammonia in the gas avoiding the presence of sulphur dioxide in the latter, this ammonia then being removed in a further treatment in any suitable manner.

9. The process of producing sulphates and sulphur by intramolecular transformation, which consists in heating under pressure solutions obtained by scrubbing coal distillation gas containing ammonia and hydrogen sulphide with water, acidifying the latter separately with sulphur dioxide for again scrubbing the gas, in a cycle, until it becomes sufficiently enriched with the salts thus formed (sulphites, thionates) for the said transformation, to which the solution is conducted continuously after the acidification, the scrubbing being effected in three stages; first by a sufficient admission of the acidified solution for the complete removal of the ammonia and hydrogen sulphide; in the second stage by some solution from the first scrubbing with the addition of ammonia and water in order to remove the acid compounds from the gas and to communicate to the latter some ammonia, recovered in the third treatment in any suitable manner.

10. The process set forth in claim 9, wherein the ammonia is recovered in the third stage with the transformed sulphate solution containing free sulphuric acid.

11. The process according to claim 9, wherein the ammonia is recovered in the third stage with the transformed solution to which sulphuric acid is added.

12. The process set forth in claim 9, wherein the ammonia is recovered in a saturator traversed by the gas, the crystallized sulphate being obtained by evaporating the solution by the gas preheated and by ejecting the salt in a suitable manner.

13. The process set forth in claim 7, wherein the scrubbing of the gas is effected in three stages, first by a sufficient admission of the acidified solution for the complete removal of the ammonia and hydrogen sulphide, the gas, in order to accelerate the reaction between $H_2S$ and $SO_2$, being passed through an electric field before the second stage, which is effected by some solution from the first scrubbing with the addition of ammonia in order to remove the acid compounds from the gas and to communicate to the gas some ammonia, recovered in the third treatment.

CHARLES HARNIST.